United States Patent
Hoff, Jr.

(10) Patent No.: US 7,296,399 B2
(45) Date of Patent: Nov. 20, 2007

(54) METHOD TO GENERATE INERT GAS FROM EXHAUST GAS ON-SITE

(76) Inventor: Robert A. Hoff, Jr., 12122 Maple Rock, Houston, TX (US) 77077

( * ) Notice: Subject to any disclaimer, the term of this patent is extended or adjusted under 35 U.S.C. 154(b) by 0 days.

(21) Appl. No.: 11/329,698

(22) Filed: Jan. 11, 2006

(65) Prior Publication Data

US 2007/0157802 A1 Jul. 12, 2007

(51) Int. Cl.
- B01D 46/00 (2006.01)
- F02B 3/00 (2006.01)
- F01N 3/02 (2006.01)

(52) U.S. Cl. .................. 60/273; 55/385.3; 60/285; 60/299; 60/311; 60/320; 95/1; 95/14; 95/19; 95/288; 96/417; 96/420; 422/177

(58) Field of Classification Search .......... 95/1, 95/14, 15, 16, 17, 18, 19, 36, 288, 289, 290; 55/385.3; 96/417, 420, 421; 60/285, 299, 60/311, 320, 273; 422/177
See application file for complete search history.

(56) References Cited

U.S. PATENT DOCUMENTS

| | | | | |
|---|---|---|---|---|
| 4,793,832 A | * | 12/1988 | Veltman et al. | 95/14 |
| 5,259,868 A | * | 11/1993 | Doubrawa et al. | 95/12 |
| 5,456,064 A | | 10/1995 | Graves | 60/276 |
| 6,823,660 B2 | | 11/2004 | Minami | 60/280 |
| 6,893,615 B1 | * | 5/2005 | Alexander | 422/177 |
| 6,913,636 B2 | * | 7/2005 | Defrancesco et al. | 95/8 |
| 6,948,309 B2 | * | 9/2005 | Fuerhapter | 60/278 |
| 7,081,153 B2 | * | 7/2006 | Leigh et al. | 95/14 |
| 7,172,156 B1 | * | 2/2007 | Jones | 244/135 R |
| 2002/0028168 A1 | | 3/2002 | Giacobbe | 423/212 |

* cited by examiner

Primary Examiner—Duane Smith
Assistant Examiner—Sonji Turner
(74) Attorney, Agent, or Firm—Buskop Law Group, PC; Wendy Buskop

(57) ABSTRACT

Methods for extracting and compressing an inert gas from an exhaust gas of an engine relate to providing an inert gas processing system including a multi-stage gas compressor to receive the exhaust gas from an exhaust gas processing system, a cooling and extraction system to receive the exhaust gas from each stage of the multi-stage gas compressor and remove liquids from the exhaust gas, and a controller to monitor operation of the inert gas processing system. The methods include processing the exhaust gas before each stage of the multi-stage gas compressor to clarify the inert gas in the exhaust gas, processing the exhaust gas after each stage of the multi-stage gas compressor to clarify the inert gas in the exhaust gas and compressing the inert gas processed for export from the inert gas processing system.

7 Claims, 3 Drawing Sheets

METHOD TO GENERATE INERT GAS FROM EXHAUST GAS ON-SITE

FIELD

The present embodiments relate to methods of producing and compressing inert gas from exhaust gas utilizing a machine with a small footprint.

BACKGROUND

Methods for generating inert gases (such as, nitrogen gas streams or of primarily nitrogen gas stream in combination with other inert gases, such as carbon dioxide, are used in many different industrial applications. For example, an inert gas or an inert gas mixture can be used to prevent instantaneous combustion or explosive ignition, in limiting corrosion and oxidation (for example, as in inert gas blanketing), in semi-conductor manufacturing processes, or in specialized heat treating applications.

Inert gases can be used for inerting the ullage in large oil tanks or other types of containers employed to store or deliver combustible fluids. In these cases, an inert gas or an inert gas mixture is used to fill the head space in the tanks prior to filling or during off-loading of the tanks. This precaution is employed to prevent combustion or explosions within the tanks due to the initial presence or influx of air during the filling and/or emptying process.

Inert gases have been used to facilitate the removal of crude oil from semi-depleted oil wells. Injection of the inert gas into these wells causes some of the gas to dissolve within the residual oil reserves due to substantial overpressure created by the gas deep within the wells. The subsequent increase in reservoir pressure and/or reductions of well fluid column weight while flowing is capable of bringing large quantities of additional oil to the surface. In other cases, multiple inert gas injection sites, surrounding a centralized non-pressurized extraction site, may be simultaneously pressurized with an inert gas or mixture of inert gases. In this scenario, circumferential gas pressure alone will tend to force residual quantities of subsurface oil to flow to the surface region of a well through the centralized non-pressurized extraction site.

In order for a gas to be used as an inert gas in applications where the prevention of combustion and/or oxidation is critical, the oxygen content in the inert gas must be sufficiently reduced to a level that will not sustain fire or explosion. For example, inert gases having oxygen contents of less than about 2.0 percent by volume are preferred for inerting the head space in oil tankers.

High purity, cryogenic grade liquid nitrogen, which can be vaporized to produce high purity gaseous nitrogen, is usually about 99.99 percent pure (at least). This grade of nitrogen is typically employed in various inerting processes, including some of the applications already mentioned herein.

Cryogenic grade liquid nitrogen is generally made in large air separation plants, transported in the liquid state to a point of use location, and employed either directly as a liquid or as a gas after vaporization. Argon is another type of inert gas which is produced and employed similarly. The generation, transportation, and vaporizing of high purity cryogenic grade inert gases is very costly.

Some existing methods utilized to produce inert gas on-site entail conventional membrane systems employed to produce gaseous nitrogen from air. These kinds of systems typically produce gaseous nitrogen onsite with purity levels on the order of about 90 to 93 percent by volume. However, these systems are quite expensive due to high energy requirements and achieve relatively low nitrogen gas flow rates at high purity production levels.

An alternative way to produce an inert gas stream is through the combustion of an organic fuel. For example, the product gas stream produced as a result of any combustion process involving the burning of gasoline, diesel fuel, or natural gas in the air generally contains high levels of nitrogen, some carbon dioxide, and small amounts of oxygen, carbon monoxide, and water vapor.

The carbon dioxide and water vapor impurities are relatively inert, thus are not objectionable in many subsequent uses of the inert gas. For most applications, the oxygen level is low enough at process discharge to be used as an inert gas. If necessary, water vapor can be removed (typically, by two phase separators, adsorption, or by a membrane permeation technique).

A need exists to efficiently produce inert gases with simple on-site methods, thus avoiding high transportation costs associated with delivery to point of use locations.

A need exists to reduce the high costs associated using current on-site methodologies to generate inert gases due to high energy requirements, and to achieve higher nitrogen gas flow rates at high purity production levels without compromising safety concerns.

The embodiments meet these needs.

BRIEF DESCRIPTION OF THE DRAWINGS

The detailed description will be better understood in conjunction with the accompanying drawings as follows.

Figure 1:
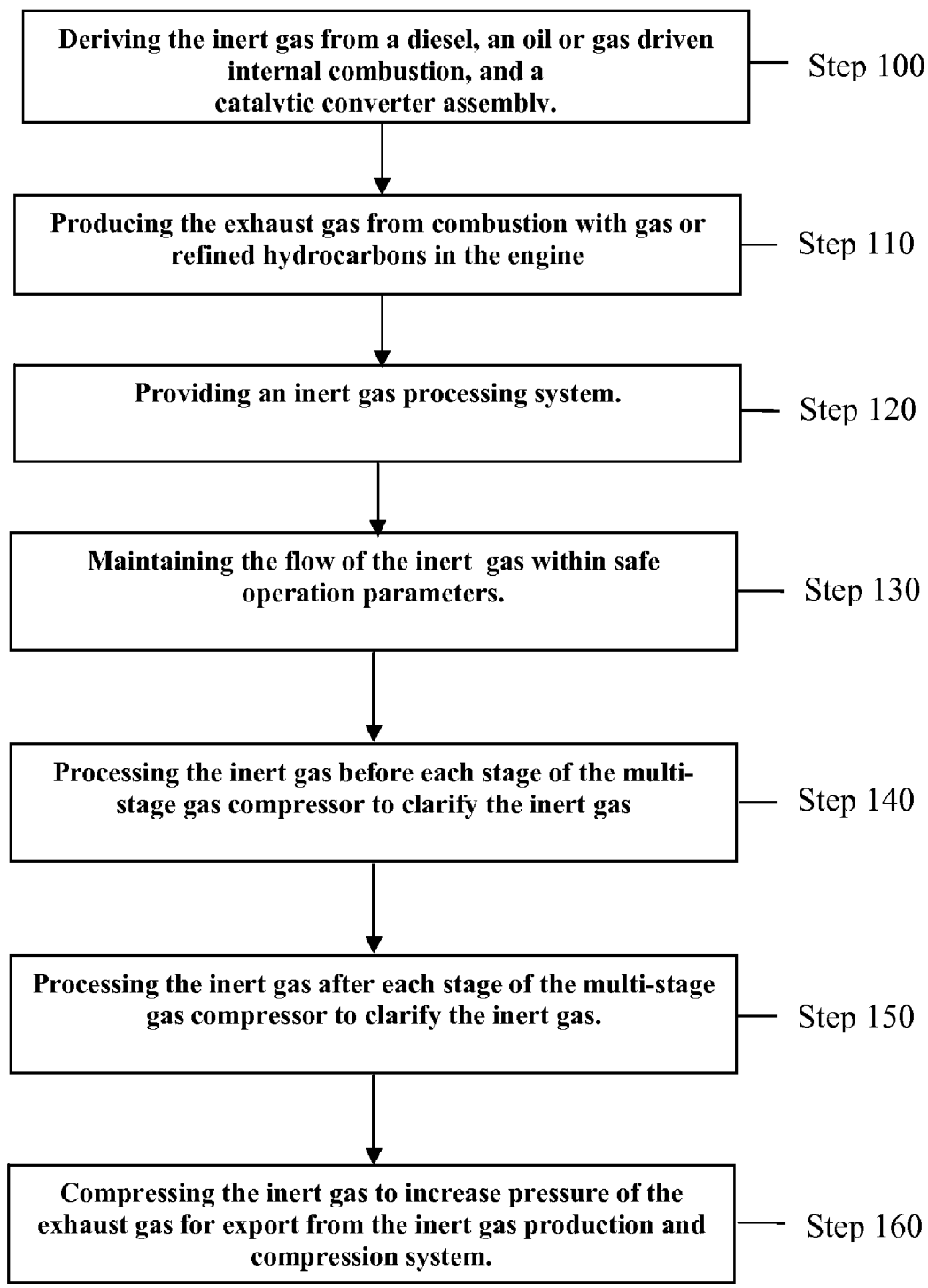
FIG. 1 depicts a flow chart of an embodiment of the methods.

The present embodiments are detailed below with reference to the listed Figures.

DETAILED DESCRIPTION OF THE EMBODIMENTS

Before explaining the embodiments in detail, it is to be understood that the embodiments are not limited to the particular embodiments and that they can be practiced or carried out in various ways.

The embodiments relate to methods for extracting and compressing inert gas from exhaust gases from an engine. The exhaust gases are processed before and after each stage of a multi-stage gas compressor to clarify the inert gas in the exhaust gas. The methods entail compressing the inert gas processed for export from an inert gas processing system.

The embodied methods are easier to utilize given that the methods require fewer number of steps to monitor and use. The methods utilize faster start-up procedures than comparable methods. These features lower operating costs and require less logistical support than currently utilized methods.

In addition, liquid nitrogen is not utilized in the embodied methods, thereby minimizing the risk of harm to personnel from potential liquid nitrogen spills. The methods lower the risk of oxygen starvation to personnel from nitrogen displacement of oxygen in a closed environment in existing methodologies.

The embodied methods utilize exhaust gas produced from combustion with gas or refined hydrocarbons in the engine. An example of a usable source of exhaust gas is exhaust gas from a diesel, oil, or gas driven internal combustion engine having an exhaust outlet, a fuel control valve, and an ignition advance/retard control. Another example is exhaust gas from a catalytic converter assembly of one or more catalytic converters.

The embodied methods can remove and separate liquids and particulate from the exhaust gas of an engine by providing an inert gas processing system.

The inert gas processing system can include a multi-stage gas compressor to receive the exhaust gas from an exhaust gas processing system, a cooling and extraction system to receive the exhaust gas from each stage of the multi-stage gas compressor and remove liquids from the exhaust gas, and a controller to monitor operation of the inert gas processing system. Examples of controllers used in the embodiments include engine speed controllers; liquid level maintenance controllers; emergency shut down controllers; inlet gas pressure controllers; export gas pressure controllers; export gas temperature controllers; and combinations thereof.

The embodied methods can process the exhaust gas before each stage of the multi-stage gas compressor to clarify the inert gas in the exhaust gas, and can process the exhaust gas after each stage of the multi-stage gas compressor to clarify the inert gas in the exhaust gas.

The embodied methods can compress the inert gas processed for export of the inert gas from the inert gas processing system. The inert gas is compressed to increase pressure of the inert gas for export of the inert gas from the inert gas production and compression system. The step of compressing the inert gas is driven by the engine used in the inert gas processing system.

The flow of the exhaust gas can be maintained within safe operation parameters by utilizing a sensing means and a microprocessor connected to the sensing means. The sensing means can be adapted to maintain exhaust gas temperature within a predetermined low-temperature region, and can include a temperature sensor.

With reference to the figures, FIG. 1 depicts a flow chart of an embodied method for extracting and compression an inert gas from an exhaust of an engine. The depicted method can derive exhaust gas from a diesel, oil or gas driven internal combustion engine (Step 100). The combustion engine can be a diesel, an oil, or gas driven internal combustion engine. The combustion engine can include an exhaust outlet, a fuel control valve, and an ignition advance/retard control.

An embodiment of the methods can derive exhaust gas from a catalytic converter assembly. The catalytic converter assembly can include one or more catalytic converters, an inlet, and an outlet. The inlet can be connected by a first conduit to the exhaust outlet of the oil or gas driven internal combustion engine.

The method can produce exhaust gas from combustion with gas or refined hydrocarbons in the engine (Step 110), and can provide an inert gas processing system for generating inert gases form exhaust gas (Step 120).

The inert gas processing system can include a multi-stage gas compressor to receive the exhaust gas from an exhaust gas processing system, a cooling and extraction system to receive the exhaust gas from each stage of the multi-stage gas compressor and remove liquids from the exhaust gas, and a controller to monitor operation of the inert gas processing system.

The methods can maintain flow of the exhaust gas within safe operation parameters by utilizing a sensing means and a microprocessor connected to the sensing means. (Step 130). The embodied inert gas production and compression systems can include sensing means and an associated microprocessor to maintain flow of the exhaust within safe operation parameters. The sensing means can be sensors that monitor physical characteristics of the system and fluids, both gas and liquid. The sensing means can measure the operating physical characteristics as well as monitor for low and high conditions in order to being a shutdown process. For example, the sensing means can be adapted to maintain the exhaust gas temperature within a predetermined temperature region. In another example, a temperature sensor can be used to aid the sensing means. In yet another example, an oxygen sensor can be used to monitor export gas oxygen content. The sensing means can be adapted to maintain exhaust gas temperature within a predetermined temperature region, and can include a temperature sensor.

As further depicted in FIG. 1, an embodiment of the method can process the exhaust gas before each stage of the multi-stage gas compressor to clarify the inert gas in the exhaust gas (Step 140), and can process the exhaust gas after each stage of the multi-stage gas compressor to clarify the inert gas in the exhaust gas (Step 150).

The inert gas processed can be compressed for export from the inert gas processing system (Step 160), which can increase pressure of the exhaust gas for export. Compressing the inert gas can be driven by the engine used in the inert gas processing system.

Figure 2:
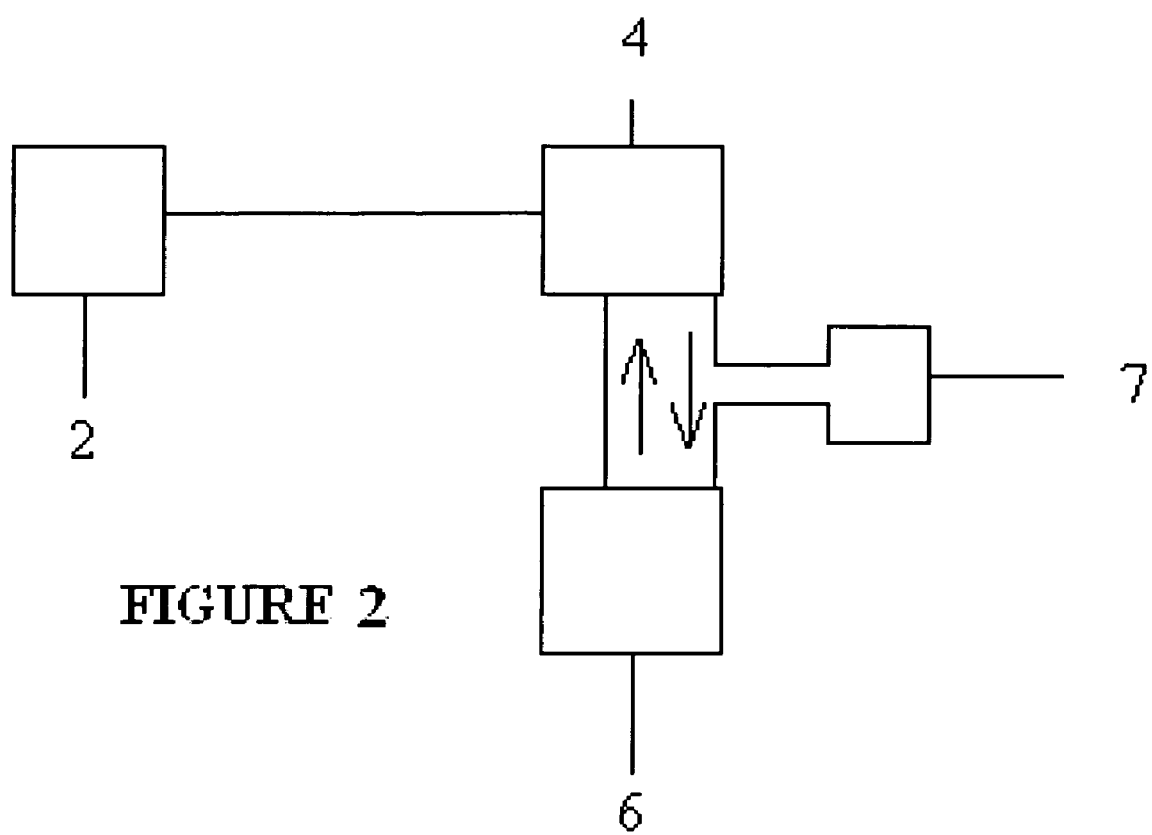
FIG. 2 depicts an overall diagram of an embodiment of an inert gas production and compression system.

FIG. 2 depicts an overall diagram of an embodiment of an inert gas production and compression systems. The depicted embodiment includes a power and gas generator (2) in communication with an inert gas processing system (4) in communication with a compression system (6). An example of a power and gas generator is a Caterpillar 3406 available from Caterpillar, Inc. of Peoria, Ill. The treated inert gas is exported via an outlet valve (7).

Figure 3:
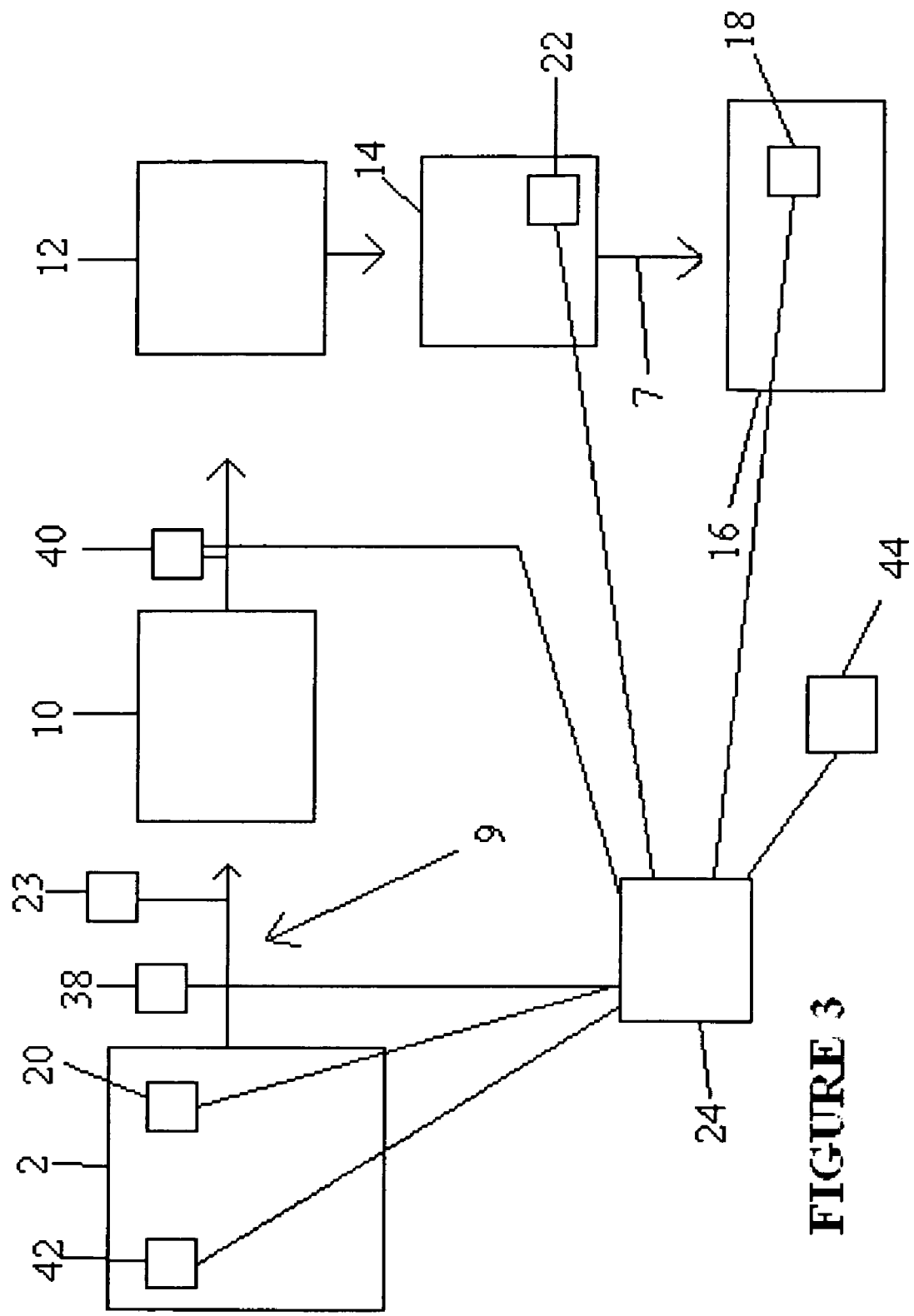
FIG. 3 depicts a diagram of the flow path of an embodiment of an inert gas processing system.

FIG. 3 depicts a diagram of the flow path of an embodiment of an inert gas processing system. In the depicted embodiment, the inert gas processing system receives exhaust gas (9) from the power and inert gas generator (2). The power and inert gas generator (2) then clarifies, separates, cools, and conditions the exhaust gases. The exhaust gases are passed to a catalyst and particulate trap (10). An example catalyst and particulate trap is a base metal coated particulate filter from Haldor Topsoe or a CDPF from Johnson Matthey.

The catalyst and particulate trap (10) sends the gasses to a cooling system (12), such as an Air-X-changer fin/fan cooler. The flow rate for the gasses can be from about 20 standard cubic feet per minute to more than 2000 standard cubic feet per minute.

The cooled exhaust gases flow from the cooling system (12) to the separator (14) in order to remove liquids, such as water and condensate. An example separator is a model Whirlyscrub V from Natco of Houston, Tex. Other separators can operate within the scope of the embodiments. Other vessels, such as coalescing filters and filter separators, can be used within the scope of the embodied systems. Examples cooling systems (12) include horizontal, multistage, fan forced air fin assemblies (such as, a model F from Air-X-changers in Tulsa, Okla.) and water cooled heat exchangers.

Continuing with FIG. 3, from the separator (14), the conditioned gases flow into a single stage compressor (16) or a multi stage positive displacement compressor. The treated inert gas is then exported via an outlet valve (7). An example of a single stage compressor is Model SSM available from Gardner Denver located in Quincy, Ill. Rotary compressors or screw compressors can be used; however, for very high pressures of over 300 psi and above, positive displacement compressors should be used. An example of a multistage positive displacement compressor is a model JGA/4 from Ariel of Mt. Vernon, Ohio.

For the multi stage positive displacement compressor, the exhaust gas can be treated after each stage of the compressor process. The gasses are returned from each stage of the multistage compressor to the cooling system (12) and then through the separator (14). The gasses then flow to the subsequent stage of the compressor.

A controller (18) can be used as a control and monitoring system for the compressor (16). The controller (18) can be used as an emergency shut down system.

The power and inert gas generator (2) can have a controller (20) for controlling the speed or the rpms of the power and inert gas generator (2). As an example, a controller (22) can be located on the separator (14) and used as a liquid level maintenance controller. An example of a liquid level maintenance controller is Model 1001a controller available from Norriseal of Houston, Tex. Further, a controller (23) can be used for setting the inlet gas pressure between the power and inert gas generator (2) and the catalyst and particulate trap (10).

A microprocessor system (24) can be used to communicate and/or operate all controllers (18, 20, 22 and 23). An example of a usable microprocessor system is the "IDEA"™ system available from Production Testing Services of Houston, Tex., wherein the microprocessor system (24) is disposed on any commercially available computer system.

A safety device, such as a series 900 safety pressure valve form Anderson Greenwood of Houston, Tex., can be used on the separator (14) to protect against over pressurization. Temperature and pressure sensors (38, 40, 42 and 44) can be used throughout the embodied inert gas production and compression systems. The temperature and pressure sensors (38, 40, 42 and 44) can be in communication with the microprocessor (24) and respective components.

While these embodiments have been described with emphasis on the embodiments, it should be understood that within the scope of the appended claims, the embodiments might be practiced other than as specifically described herein.

What is claimed:

1. A method of extracting and compressing an inert gas from an exhaust gas of an engine, wherein the method comprises the steps of:
   a. providing a power and inert gas generator adapted to operate on diesel, oil, gas, and combinations thereof, and providing an inert gas processing system comprising:
      i. a particulate trap and catalytic converter, for receiving exhaust gas from the power source and inert gas generator, further inerting and clarifying the exhaust gas from the inert gas generator, wherein the particulate trap removes a substantial portion of particulate from the exhaust gas, and wherein the catalytic converter further inerts the exhaust gas forming inert gas;
      ii. a cooling and extraction system to receive inert gas from the catalytic converter, wherein the cooling and extraction system comprises a heat exchanger for cooling the inert gas and a separator for removing liquids and another portion of particulate from the inert;
      iii. valving and a controller to monitor and control the operation of the inert gas processing system;
   b. flowing the inert gas to an inert gas compressor;
   c. compressing the inert gas using the inert gas compressor forming compressed inert gas; and
   d. exporting the inert gas from the compressor to an outside application.

2. The method of claim 1, wherein the controller comprise a member selected from the group consisting of an engine speed controller; liquid level maintenance controllers; emergency shut down controllers; gas pressure setting controllers; other operational controllers; and combinations thereof.

3. The method claim 1, further comprising the step of further compressing the clarified inert gas to increase pressure of the inert gas for the export of the inert gas from the compressor to a high pressure application.

4. The method claim 1, wherein the step of compressing the inert gas further comprises driving the compressor using the power and inert gas generator.

5. The method claim 1, further comprising the step of maintaining flow of the exhaust gas within safe operation parameters by utilizing a sensing means and a microprocessor connected to the sensing means.

6. The method claim 5, wherein the sensing means is adapted to maintain exhaust gas temperature within a predetermined low-temperature region.

7. The method claim 5, wherein the sensing means comprises a temperature sensor.

* * * * *